United States Patent
Resch et al.

(10) Patent No.: US 10,331,518 B2
(45) Date of Patent: Jun. 25, 2019

(54) ENCODING DATA IN A DISPERSED STORAGE NETWORK

(71) Applicant: International Business Machines Corporation, Armonk, NY (US)

(72) Inventors: Jason K. Resch, Chicago, IL (US); Wesley B. Leggette, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 25 days.

(21) Appl. No.: 15/818,641

(22) Filed: Nov. 20, 2017

(65) Prior Publication Data
US 2018/0074899 A1    Mar. 15, 2018

Related U.S. Application Data

(63) Continuation-in-part of application No. 15/612,082, filed on Jun. 2, 2017, which is a continuation of
(Continued)

(51) Int. Cl.
*G06F 11/00* (2006.01)
*G06F 11/10* (2006.01)
(Continued)

(52) U.S. Cl.
CPC ...... *G06F 11/1076* (2013.01); *G06F 11/1044* (2013.01); *G06F 11/142* (2013.01);
(Continued)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Mujtaba M Chaudry
(74) *Attorney, Agent, or Firm* — Garlick & Markison; Timothy W. Markison; Bruce E. Stuckman (57) ABSTRACT

A method for execution by an integrity processing unit includes performing a deterministic function on data for storage to produce an integrity value. The data and the integrity value are combined in accordance with a combining function to produce a data package. The processing system determines an encryption approach in response to determining to encrypt the data package. The data package is encrypted in accordance with the encryption approach to produce a secure package. The secure package is encoded to produce a set of slices. The set of slices is decoded to reproduce the secure package. The secure package is decrypted to reproduce the data package. The data package is de-combined in to generate reproduced data and a received integrity value. The deterministic function is performed on the data to produce a calculated integrity value, and the received integrity value is compared to the calculated integrity value.

20 Claims, 6 Drawing Sheets

Related U.S. Application Data application No. 14/844,328, filed on Sep. 3, 2015, now Pat. No. 9,747,160, which is a continuation of application No. 13/944,277, filed on Jul. 17, 2013, now Pat. No. 9,154,298.

(60) Provisional application No. 61/696,018, filed on Aug. 31, 2012.

(51) Int. Cl.
| | |
|---|---|
| H04L 9/08 | (2006.01) |
| G06F 11/20 | (2006.01) |
| H04L 29/08 | (2006.01) |
| G06F 21/60 | (2013.01) |
| G06F 21/10 | (2013.01) |
| G06F 21/62 | (2013.01) |
| H03M 13/00 | (2006.01) |
| G06F 11/14 | (2006.01) |
| H03M 13/37 | (2006.01) |
| G06F 11/07 | (2006.01) |
| H03M 13/15 | (2006.01) |

(52) U.S. Cl.
CPC .......... *G06F 11/2094* (2013.01); *G06F 21/10* (2013.01); *G06F 21/60* (2013.01); *G06F 21/6218* (2013.01); *G06F 21/6272* (2013.01); *H03M 13/3761* (2013.01); *H03M 13/611* (2013.01); *H04L 9/0861* (2013.01); *H04L 9/0894* (2013.01); *H04L 67/1097* (2013.01); *G06F 11/0712* (2013.01); *G06F 11/0784* (2013.01); *G06F 11/0787* (2013.01); *G06F 11/1004* (2013.01); *G06F 11/1092* (2013.01); *H03M 13/1515* (2013.01); *H03M 13/616* (2013.01); *H04L 2209/34* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,125,424 A * | 9/2000 | Komatsu | G11C 29/76 |
| | | | 711/103 |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Raiford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,154,298 B2 | 10/2015 | Resch | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 * | 7/2006 | Kitamura | G06F 11/1092 |
| | | | 714/6.21 |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 * | 10/2007 | Soran | G06F 3/0608 |
| | | | 714/6.22 |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0268938 A1 * | 10/2010 | Resch | H04L 9/0897 |
| | | | 713/153 |
| 2010/0306578 A1 * | 12/2010 | Thornton | G06F 11/1076 |
| | | | 714/6.12 |
| 2010/0332751 A1 * | 12/2010 | Quigley | H04L 63/0428 |
| | | | 711/114 |
| 2011/0029753 A1 * | 2/2011 | Baptist | G06F 11/1076 |
| | | | 711/170 |
| 2012/0089885 A1 | 4/2012 | Grube et al. | |
| 2013/0003868 A1 * | 1/2013 | Sjoberg | H04N 19/70 |
| | | | 375/240.26 |
| 2013/0111166 A1 * | 5/2013 | Resch | G06F 11/1076 |
| | | | 711/162 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

ENCODING DATA IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/612,082, entitled "SECURELY STORING DATA IN A DISPERSED STORAGE NETWORK", filed Jun. 7, 2017, which is a continuation of U.S. Utility application Ser. No. 14/844,328, entitled "SECURELY STORING DATA IN A DISPERSED STORAGE NETWORK", filed Sep. 3, 2015, issued as U.S. Pat. No. 9,747,160 on Aug. 29, 2017, which is a continuation of U.S. Utility application Ser. No. 13/944,277, entitled "SECURELY STORING DATA IN A DISPERSED STORAGE NETWORK", Jul. 17, 2013, issued as U.S. Pat. No. 9,154,298 on Oct. 6, 2015, which claims priority pursuant to 35 U.S.C. § 119(e) to U.S. Provisional Application No. 61/696,018, entitled "AUTHORIZING ACCESS TO A DISTRIBUTED STORAGE AND TASK NETWORK", filed Aug. 31, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
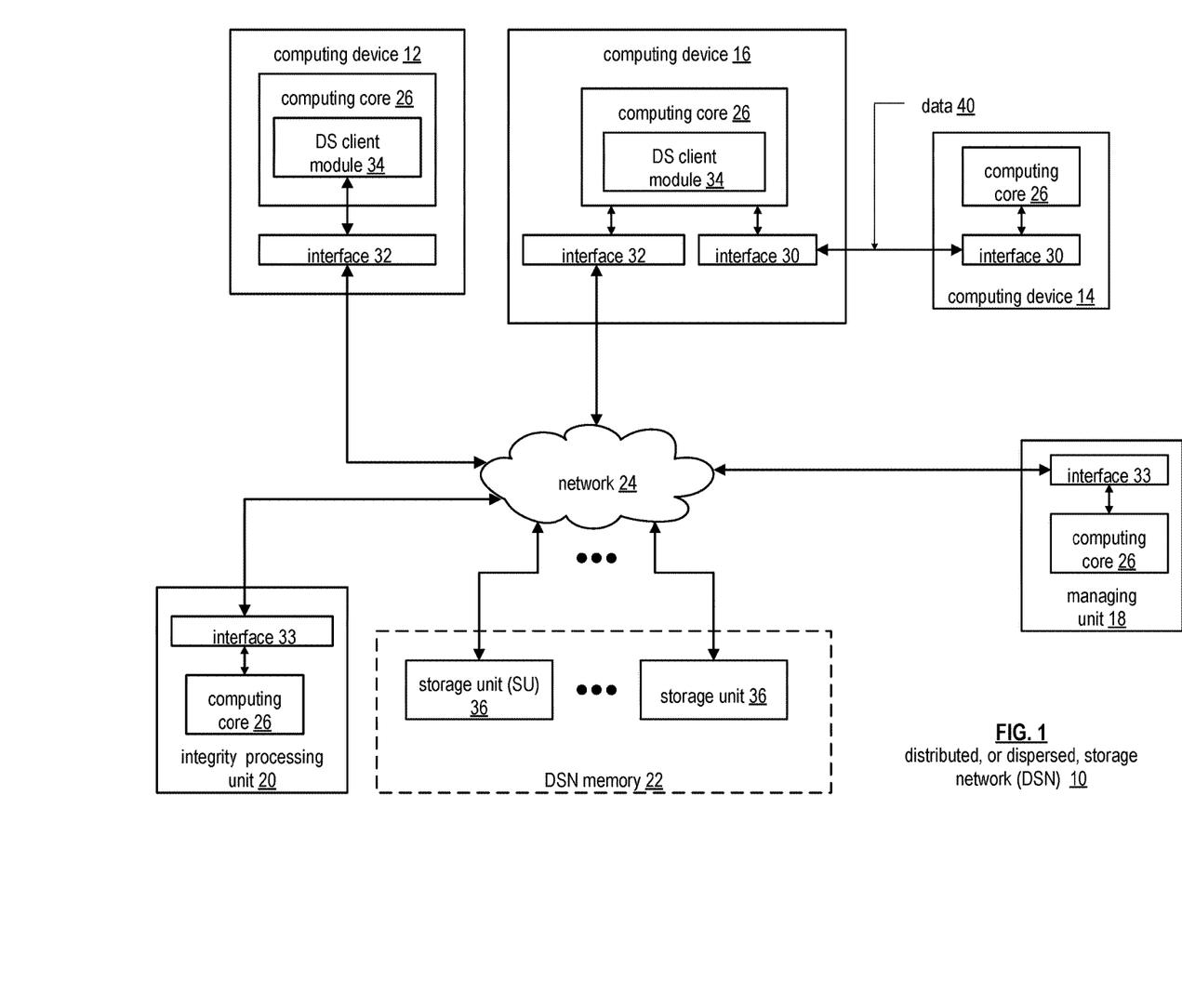
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
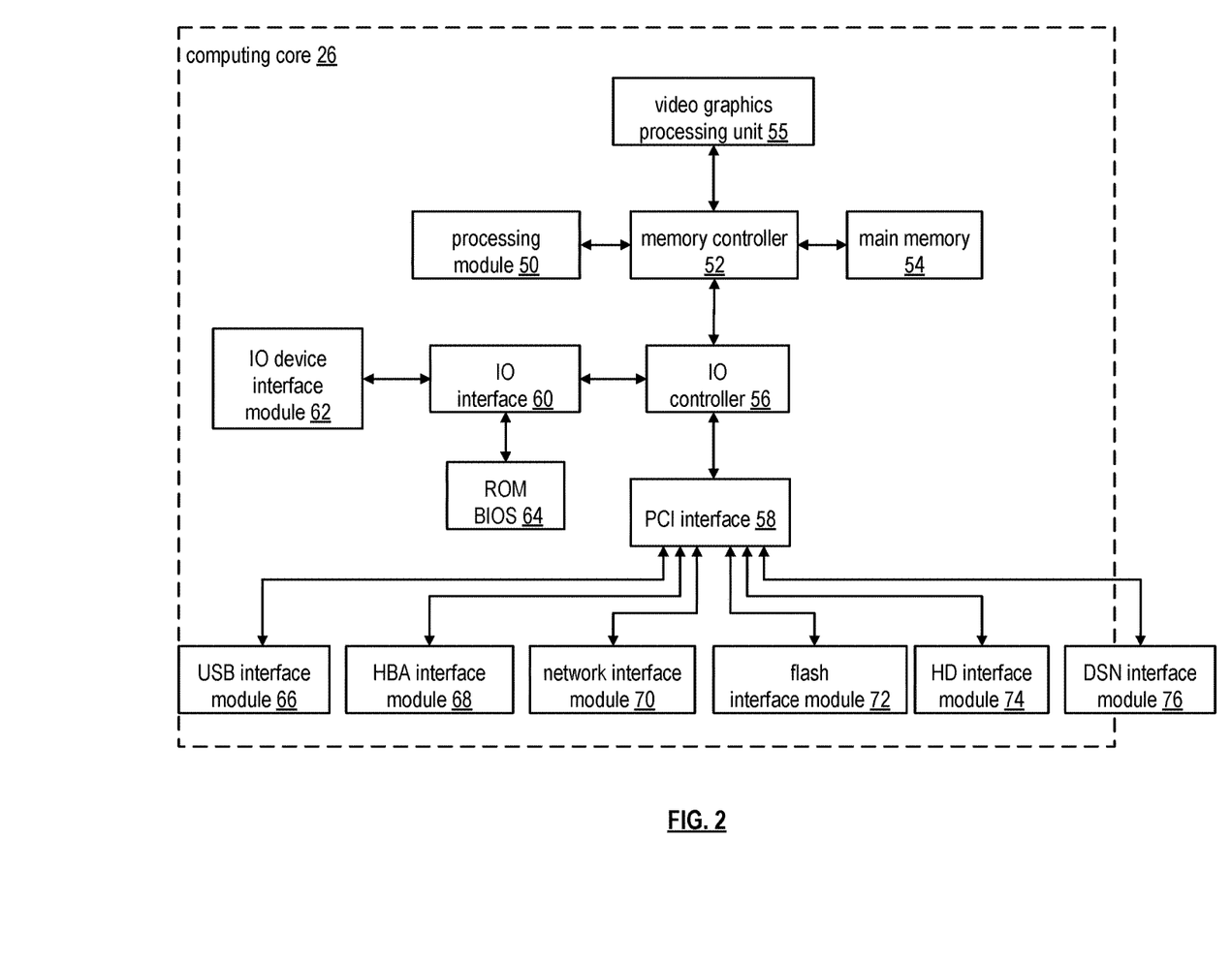
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
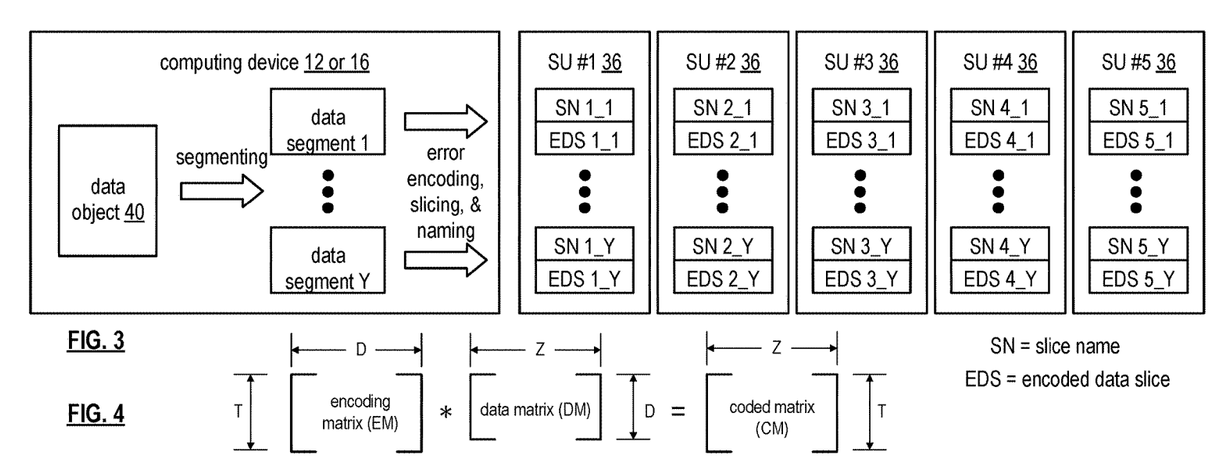
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
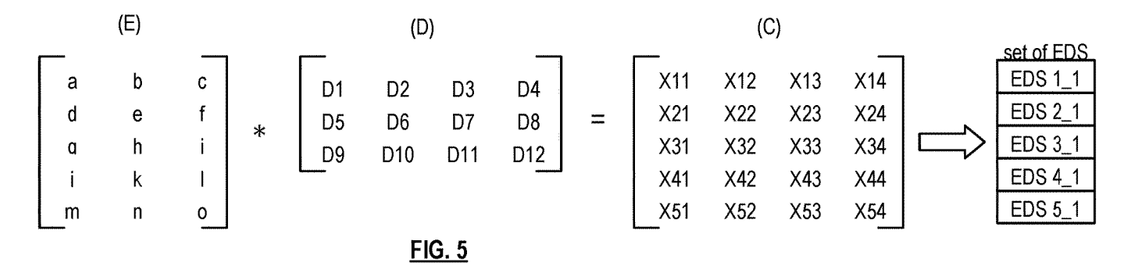
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
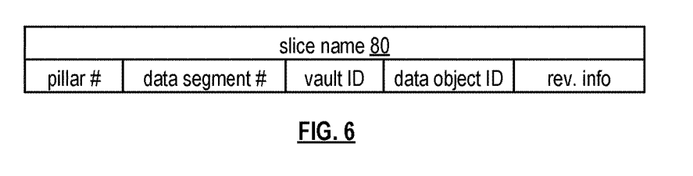
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
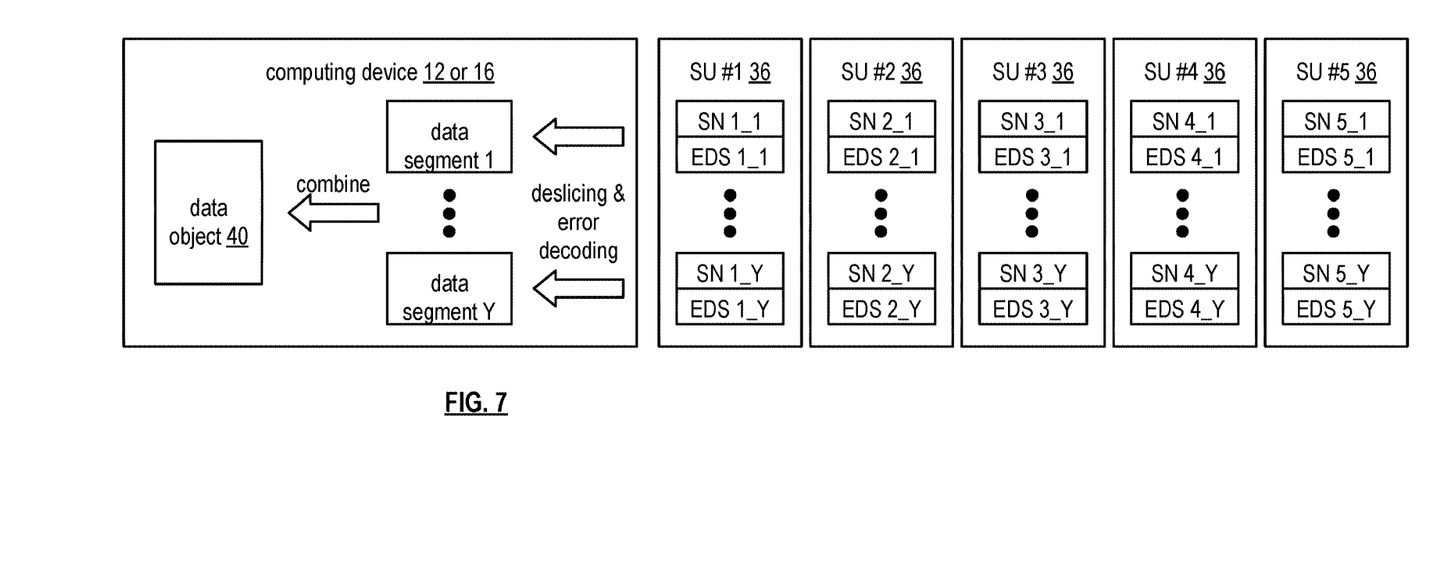
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
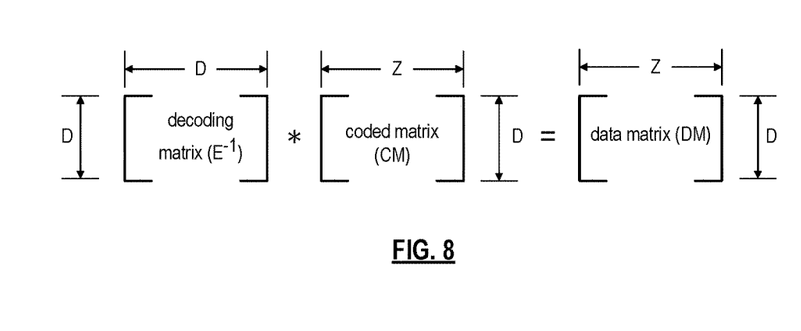
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
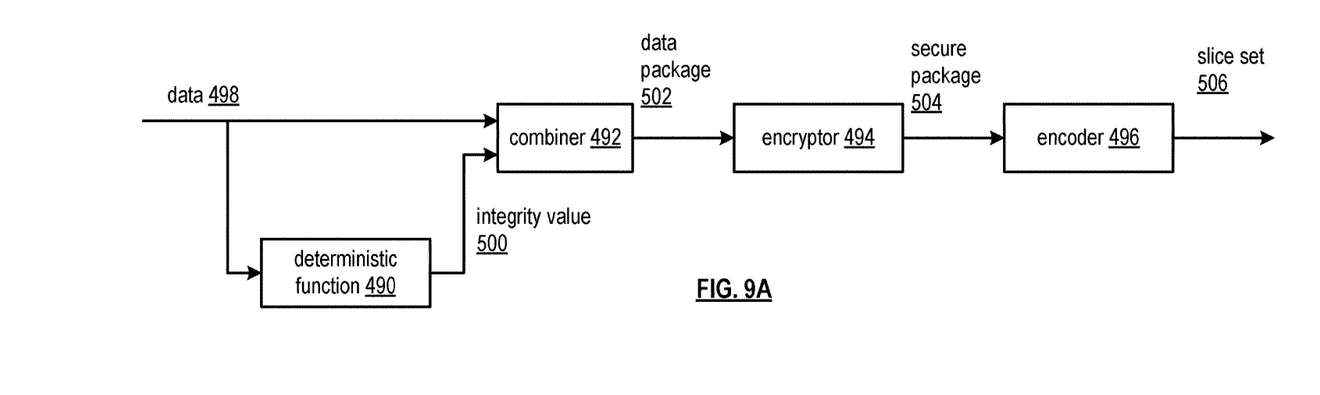
FIGS. 9A and 9B is a schematic block diagram of an embodiment of a dispersed or distributed storage network (DSN) in accordance with the present invention.

FIG. 9A is a schematic block diagram of an embodiment of a data encoding system that includes a deterministic function 490, a combiner 492, an encryptor 494, and an encoder 496. The deterministic function 490, combiner 492, encryptor 494, and/or encoder 496 can be implemented by utilizing a computing device 12 or 16 of FIG. 1, the integrity processing unit 20, and/or any processing system that communicates with the network 24 that includes at least one processor and memory. In various embodiments, the computing core 26 and/or DS client module 34 can be utilized to implement the deterministic function 490, combiner 492, encryptor 494, and/or encoder 496. Some or all of the deterministic function 490, combiner 492, encryptor 494, and/or encoder 496 can be implemented by utilizing the same device or different devices, for example, where output of deterministic function 490, combiner 492, and/or encryptor 494 is transmitted via network 24 as input to the respective combiner 492, encryptor 494, and/or encoder 496.

The deterministic function 490 can include at least one of a hashing function, a cyclic redundancy check function (CRC), a hash-based message authentication code (HMAC) function, and a masked generating (MGF) function. The deterministic function can receive data 498 (e.g., a data segment), for example, in response to a request to protect and/or store the data with threshold-secure integrity protection, and can apply the deterministic function to the data 498 to produce an integrity value 500. When utilizing the HMAC deterministic function, the deterministic function can utilize a key derived from the data utilizing another deterministic function. The received data can be determined by the DSN to be protected with threshold-secure integrity protection, and the deterministic function can be applied in response.

The combiner 492 can combine the data 498 and the integrity value 500 to produce a data package 502. The combining can include at least one of interspersing the integrity value 500 in a plurality of locations across the data 498 such that at least two slices of a subsequently produced slice includes at least a portion of the integrity value 500, inserting the integrity value 500 in one location of the data 498, appending the integrity value 500 to the data 498, and/or pre-appending the integrity value 500 to the data 498. In the case that the integrity check value was split and injected throughout the data, the injection process may be such that each resulting slice (after the error encoding performed by encoder 496) contains only one of the pieces. As such, after the slices are stored to different locations, it can be difficult for an attacker to corrupt any slice without knowledge of a threshold number of slices.

The encryptor 494 can determine whether the data package 502 includes data 498 that has already been encrypted. When the encryptor 494 detects that the data 498 has already been encrypted, the encryptor 494 can pass the data package 502 through to the encoder 496. When the encryptor 494 detects that the data 498 has not already been encrypted, the encryptor 494 can encrypt the data package 502 to produce a secure package 504 by utilizing at least one of an encryption algorithm, an all or nothing transformation (AONT) function, a mathematical function, and/or a logical function (e.g., an exclusive OR function). The encoder 496 can encode the secure package 504 by utilizing a dispersed storage error coding function to produce a set of slices 506. The set of slices can be transmitted to a plurality of storage units for storage, for example, in accordance with the dispersed storage error coding scheme. A method of operation corresponding to the data encoding system is discussed in greater detail with reference to FIG. 10A.

Figure 9B:
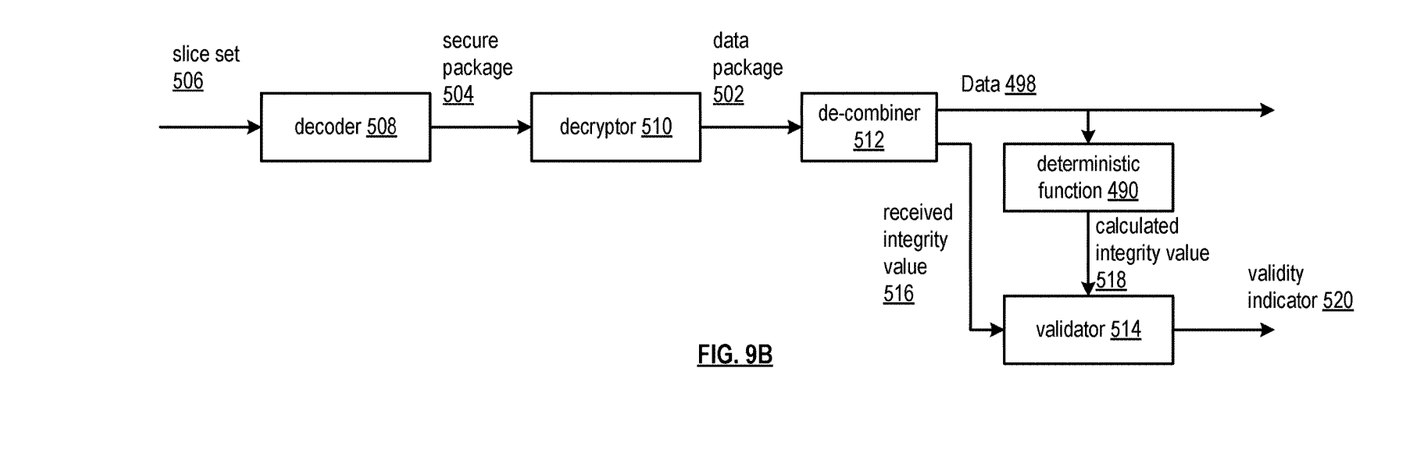

FIG. 9B is a schematic block diagram of an embodiment of a data decoding system that includes a decoder 508, a decryptor 510, a de-combiner 512, a deterministic function 490, and a validator 514. The decoder 508, decryptor 510, de-combiner 512, deterministic function 490, and/or validator 514 can be implemented by utilizing a computing device 12 or 16 of FIG. 1, the integrity processing unit 20, and/or any processing system that communicates with the network 24 that includes at least one processor and memory. In various embodiments, the computing core 26 and/or DS client module 34 can be utilized to implement the decoder 508, decryptor 510, de-combiner 512, deterministic function 490, and/or validator 514. Some or all of the decoder 508, decryptor 510, de-combiner 512, deterministic function 490, and/or validator 514 can be implemented by utilizing the same device or different devices, for example, where output of decoder 508, decryptor 510, de-combiner 512, deterministic function 490 is transmitted via network 24 as input to the respective decryptor 510, de-combiner 512, deterministic function 490, and/or validator 514. The decoder 508 can be implemented by utilizing the same or different processing system as that used to implement the encoder 496. The decryptor 510 can be implemented by utilizing the same or different processing system as that used to implement the encryptor 494. The de-combiner 512 can be implemented by utilizing the same or different processing system as that used to implement the combiner 492. The deterministic function 490 can be implemented by utilizing the same or different processing system as that used to implement the deterministic function 490 in FIG. 9A.

The decoder 508 can receive the set of slices 506 of FIG. 9A or a different set of slices. For example, the set of slices can be retrieved from a plurality of storage units in accordance with the dispersed storage error coding scheme performed to produce the set of slices, in response to a request for the data associated with the set of slices. The decoder 508 can decode the set of slices 506 by utilizing a dispersed storage error coding function to produce a secure package, which can be the reproduced secure package 504 of FIG. 9A. The decryptor 510 can decrypt the secure package 504 to produce a data package, which can be the reproduced data package 502 of FIG. 9A, by utilizing at least one of an encryption algorithm, an all or nothing transformation (AONT) function, a mathematical function, and/or a logical function (e.g., an exclusive OR function). The data package 502 can be produced by combining an integrity value with data by at least one of interspersing the integrity value in a plurality of locations across the data such that at least two slices of a subsequently produced slice includes at least a portion of the integrity value, inserting the integrity value in one location of the data, appending the integrity value to the data, and/or pre-appending the integrity value to the data.

The de-combiner 512 can de-combine portions of the data package 502 to produce data 498 and/or a received integrity value 516. The de-combining can include identifying a combining approach utilized to generate the data package.

The identifying can be based on one or more of detecting the combining approach, a lookup, a predetermination, and/or receiving the approach. The deterministic function 490 can include at least one of a hashing function, a cyclic redundancy check function (CRC), a hash-based message authentication code (HMAC) function, and/or a masked generating (MGF) function. The deterministic function 490 can apply the deterministic function to the data 498 to produce a calculated integrity value 518. The validator 514 can validate the data 498 to produce a validity indicator 520 based on a comparison of the received integrity value 516 to the calculated integrity value 518. For example, the validator 514 can generate the validity indicator 520 to indicate that the data 498 is valid when the received integrity value 516 is substantially the same as the calculated integrity value 518. In some embodiments, the validity indicator can be transmitted to a requester of the data. A method operation of the data decoding system is described in greater detail with reference to FIG. 10B.

In various embodiments, a processing system of an integrity processing unit includes at least one processor and a memory that stores operational instructions, that when executed by the at least one processor cause the processing system to perform a deterministic function on data for storage to produce an integrity value. The data and the integrity value are combined in accordance with a combining function to produce a data package. The processing system determines whether to encrypt the data package, and determines an encryption approach in response to determining to encrypt the data package. The data package is encrypted in accordance with the encryption approach to produce a secure package. The secure package is encoded to produce a set of slices. The set of slices is decoded to reproduce the secure package. The encryption approach associated with the secure package is identified, and the secure package is decrypted in accordance with the encryption approach to reproduce the data package. The data package is de-combined in accordance with the combining function to generate reproduced data and a received integrity value. The deterministic function is performed on the data to produce a calculated integrity value. A validity indicator of the reproduced data is generated based on a comparison of the received integrity value and the calculated integrity value.

In various embodiments, the secure package is encoded by utilizing a dispersed storage error coding function. The set of slices are transmitted to a plurality of storage units for storage in accordance with the dispersed storage error coding function. A request for the data is received, and the set of slices are identified in response to receiving the request. The set of slices are retrieved from the plurality of storage units for decoding.

In various embodiments, the deterministic function includes utilizing a hash-based message authentication code (HMAC), and performing the deterministic function includes utilizing a key derived from the data, where the key is derived by performing a second deterministic function. In various embodiments, one of a plurality of data security levels associated with the data is determined. The combining function includes partitioning the integrity value into a plurality of portions and interspersing the plurality of portions evenly across the data. A number of the plurality of portions is a monotonically increasing function of the one of the plurality of data security levels. In various embodiments, a test is performed on the data package to determine whether the data package is already encrypted. The integrity processing unit determines to encrypt the data package in response to determining that the data package is not already encrypted. In various embodiments, the data package is encoded to produce the set of slices in response to determining not to encrypt the data.

In various embodiments, the encryption approach includes utilizing an all or nothing transformation function, decrypting the secure package includes combining the secure package to produce encrypted data and a masked key. An exclusive OR function is performed on a hash of the encrypted data and the masked key to produce a key. The encrypted data is decrypted by utilizing the key to produce the data package.

In various embodiments, the validity indicator that indicates that the reproduced data is valid when the comparison indicates that a calculated difference between the received integrity value and the calculated integrity value compares favorably to a difference threshold. In various embodiments, the validity indicator that indicates that the reproduced data is valid when the comparison indicates that the received integrity value is equal to the calculated integrity value. In various embodiments, the validity indicator is transmitted to a requester of the data.

Figure 10A:
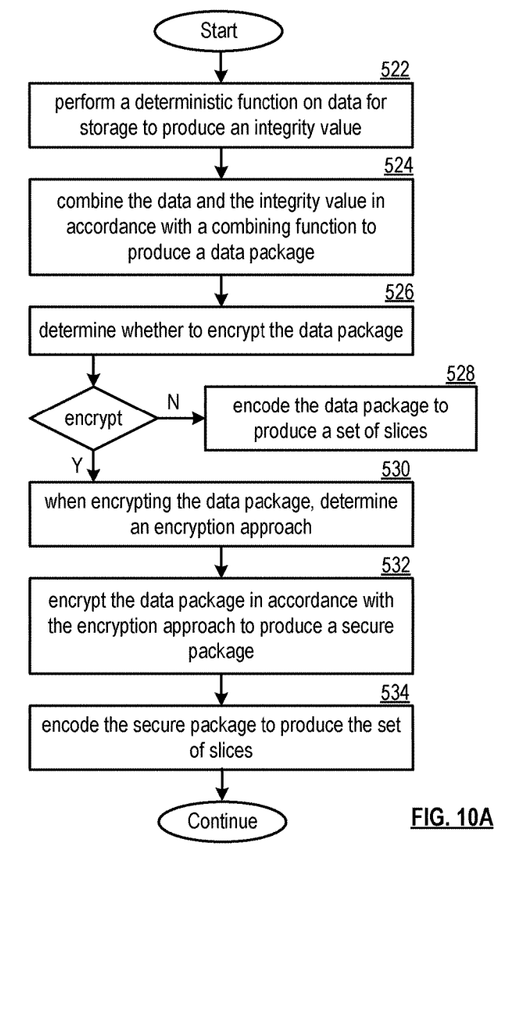
FIG. 10A is a logic diagram of an example of a method of encoding data in accordance with the present invention.

FIG. 10A is a flowchart illustrating an example of encoding data. In particular, a method is presented for use in association with one or more functions and features described in conjunction with FIGS. 1-9B, for execution by an integrity processing unit that includes a processor, a computing device that includes a processor, and/or via another processing system of a dispersed storage network that includes at least one processor and memory that stores instruction that configure the processor or processors to perform the steps described below.

The method begins at step 522 where a processing system (e.g., of an integrity processing unit, a computing device, and/or a distributed storage (DS) client module) performs a deterministic function on data for storage to produce an integrity value. For example, the data for storage can be determined by the DSN to be protected with threshold-secure integrity protection, and the deterministic function can be applied in response. The deterministic function can include utilizing a hash-based message authentication code (HMAC), and performing the deterministic function can includes utilizing a key derived from the data, where the key is derived by performing a second deterministic function. The method continues at step 524 where the processing system combines the data and the integrity value in accordance with a combining function to produce a data package. The processing system can obtain the combining function based on at least one of a predetermination, a retrieval, receiving, and a determination based on at least one of a data type, a data size indicator, a data priority level, a dispersal function, dispersal parameters, and/or a data security level requirement. For example, the processing system can determine the combining function to include partitioning the integrity value into 1000 portions and interspersing the 1000 portions evenly across the data when the data security level requirement indicates a high level of required security. In such embodiments, the number of portions can be a monotonically increasing function of the data security level, where the number of portions produced for first data associated with a first data security level is greater than the number of portions produced for second data associated with a second data security level that indicates a lower level of security than the first data security level. In such embodiments, a data security level of the data can be determined from a plurality of possible data security levels.

The method continues at step 526 where the processing system determines whether to encrypt the data package. The determining is based on at least one of a lookup, a query, receiving an encryption indicator, and/or testing the data to determine if the data is already encrypted. The method branches to step 530 when the processing system determines to encrypt the data package. The method continues to step 528 when the processing system determines not to encrypt the data package. The method continues at step 528 where the processing system encodes the data package to produce a set of slices utilizing a dispersed storage error coding function.

When encrypting the data package, the method continues at step 530 where the processing system determines an encryption approach. The determining can be based on at least one of a lookup, a query, and/or receiving the approach. The method continues at step 532 where the processing system encrypts the data package in accordance with the encryption approach to produce a secure package. The encrypting can include utilizing at least one of an encryption algorithm, an all or nothing transformation (AONT) function, a mathematical function, and/or a logical function (e.g., an exclusive OR function) The method continues at step 534 where the processing system encodes the secure package to produce the set of slices utilizing the dispersed storage error coding function. The set of slices can be transmitted to a plurality of storage units for storage, for example, in accordance with the dispersed storage error coding scheme.

Figure 10B:
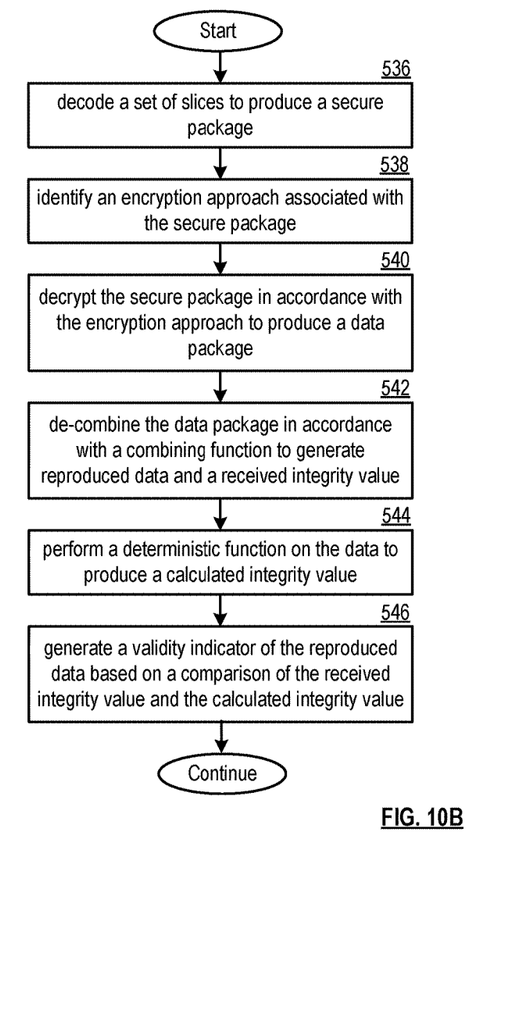
FIG. 10B is a logic diagram of an example of a method of decoding data in accordance with the present invention.

FIG. 10B is a flowchart illustrating an example of decoding data. The method begins at step 536 where a processing system (e.g., of an integrity processing unit, a computing device, and/or a distributed storage (DS) client module) decodes a set of slices to produce a secure package utilizing a dispersed storage error coding function. For example, the processing system can determine to decode the set of slices in response to a request for the data associated with the set of slices. The method continues at step 538 where the processing system identifies an encryption approach associated with the secure package. The identifying may be based on at least one of a determination, a lookup, a query, and receiving the approach. The method continues at step 540 where the processing system decrypts the secure package in accordance with the encryption approach to produce a data package, for example, by utilizing at least one of an encryption algorithm, an all or nothing transformation (AONT) function, a mathematical function, and/or a logical function (e.g., an exclusive OR function). For example, when utilizing a reverse all or nothing transformation as the encryption approach, the processing system can combine the secure package to produce encrypted data and a masked key. The processing system can perform an exclusive OR function on a hash of the encrypted data and the masked key to produce a key, and can decrypt the encrypted data utilizing the key to produce the data package.

The method continues at step 542 where the processing system de-combines the data package in accordance with a combining function to generate reproduced data and a received integrity value. The de-combining includes identifying the combining function based on at least one of a lookup, a query, and receiving a combining function. The method continues at step 544 where the processing system performs a deterministic function on the data to produce a calculated integrity value. The method continues at step 546 where the processing system generates a validity indicator of the reproduce data based on a comparison of the received integrity value and the calculated integrity value. For example, the processing system produces a validity indicator that indicates that the reproduced data is valid when the comparison indicates that the received integrity value and the calculated integrity value are equal, substantially the same, and/or that a calculated difference between the received integrity value and the calculated integrity value compares favorably to a threshold. In some embodiments, the validity indicator can be transmitted to a requester of the data.

In various embodiments, a non-transitory computer readable storage medium includes at least one memory section that stores operational instructions that, when executed by a processing system of a dispersed storage network (DSN) that includes a processor and a memory, causes the processing system to perform a deterministic function on data for storage to produce an integrity value. The data and the integrity value are combined in accordance with a combining function to produce a data package. The processing system determines whether to encrypt the data package, and determines an encryption approach in response to determining to encrypt the data package. The data package is encrypted in accordance with the encryption approach to produce a secure package. The secure package is encoded to produce a set of slices. The set of slices is decoded to reproduce the secure package. The encryption approach associated with the secure package is identified, and the secure package is decrypted in accordance with the encryption approach to reproduce the data package. The data package is de-combined in accordance with the combining function to generate reproduced data and a received integrity value. The deterministic function is performed on the data to produce a calculated integrity value. A validity indicator of the reproduced data is generated based on a comparison of the received integrity value and the calculated integrity value.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an integrity processing unit that includes a processor, the method comprises:
    performing a deterministic function on data for storage to produce an integrity value;
    combining the data and the integrity value in accordance with a combining function to produce a data package;
    determining whether to encrypt the data package;
    determining an encryption approach in response to determining to encrypt the data package;
    encrypting the data package in accordance with the encryption approach to produce a secure package;
    encoding the secure package to produce a set of slices;
    decoding the set of slices to reproduce the secure package;
    identifying the encryption approach associated with the secure package;
    decrypting the secure package in accordance with the encryption approach to reproduce the data package;
    de-combining the data package in accordance with the combining function to generate reproduced data and a received integrity value;
    performing the deterministic function on the data to produce a calculated integrity value; and
    generating a validity indicator of the reproduced data based on a comparison of the received integrity value and the calculated integrity value.

2. The method of claim 1, wherein the secure package is encoded by utilizing a dispersed storage error coding function, further comprising:
    transmitting the set of slices to a plurality of storage units for storage in accordance with the dispersed storage error coding function;
    receiving a request for the data; and
    identifying the set of slices in response to receiving the request and retrieving the set of slices from the plurality of storage units for decoding.

3. The method of claim 1, wherein the deterministic function includes utilizing a hash-based message authentication code (HMAC), and wherein performing the deterministic function includes utilizing a key derived from the data, wherein the key is derived by performing a second deterministic function.

4. The method of claim 1, further comprising:
    determining one of a plurality of data security levels associated with the data;
    wherein the combining function includes partitioning the integrity value into a plurality of portions and interspersing the plurality of portions evenly across the data, wherein a number of the plurality of portions is a monotonically increasing function of the one of the plurality of data security levels.

5. The method of claim 1, further comprising:
    performing a test on the data package to determine whether the data package is already encrypted;
    wherein the integrity processing unit determines to encrypt the data package in response to determining that the data package is not already encrypted.

6. The method of claim 1, further comprising encoding the data package to produce the set of slices in response to determining not to encrypt the data.

7. The method of claim 1, wherein the encryption approach includes utilizing an all or nothing transformation function, and wherein decrypting the secure package includes:
    combining the secure package to produce encrypted data and a masked key;
    performing an exclusive OR function on a hash of the encrypted data and the masked key to produce a key; and
    decrypting the encrypted data utilizing the key to produce the data package.

8. The method of claim 1, wherein the validity indicator that indicates that the reproduced data is valid when the comparison indicates that a calculated difference between the received integrity value and the calculated integrity value compares favorably to a difference threshold.

9. The method of claim 1, wherein validity indicator that indicates that the reproduced data is valid when the comparison indicates that the received integrity value is equal to the calculated integrity value.

10. The method of claim 1, further comprising transmitting the validity indicator to a requester of the data.

11. A processing system of an integrity processing unit comprises:
    at least one processor;
    a memory that stores operational instructions, that when executed by the at least one processor cause the processing system to:
        perform a deterministic function on data for storage to produce an integrity value;
        combine the data and the integrity value in accordance with a combining function to produce a data package;
        determine whether to encrypt the data package;
        determine an encryption approach in response to determining to encrypt the data package;
        encrypt the data package in accordance with the encryption approach to produce a secure package;
        encode the secure package to produce a set of slices;
        decode the set of slices to reproduce the secure package;
        identify the encryption approach associated with the secure package;
        decrypt the secure package in accordance with the encryption approach to reproduce the data package;
        de-combine the data package in accordance with the combining function to generate reproduced data and a received integrity value;
        perform the deterministic function on the data to produce a calculated integrity value; and
        generate a validity indicator of the reproduced data based on a comparison of the received integrity value and the calculated integrity value.

12. The processing system of claim 11, wherein the secure package is encoded by utilizing a dispersed storage error coding function, and wherein the operational instructions, when executed by the at least one processor, further cause the processing system to:

transmit the set of slices to a plurality of storage units for storage in accordance with the dispersed storage error coding function;
receive a request for the data; and
identify the set of slices in response to receiving the request and retrieving the set of slices from the plurality of storage units for decoding.

13. The processing system of claim 11, wherein the deterministic function includes utilizing a hash-based message authentication code (HMAC), and wherein performing the deterministic function includes utilizing a key derived from the data, wherein the key is derived by performing a second deterministic function.

14. The processing system of claim 11, wherein the operational instructions, when executed by the at least one processor, further cause the processing system to:
determine one of a plurality of data security levels associated with the data;
wherein the combining function includes partitioning the integrity value into a plurality of portions and interspersing the plurality of portions evenly across the data, wherein a number of the plurality of portions is a monotonically increasing function of the one of the plurality of data security levels.

15. The processing system of claim 11, wherein the operational instructions, when executed by the at least one processor, further cause the processing system to:
perform a test on the data package to determine whether the data package is already encrypted;
wherein the integrity processing unit determines to encrypt the data package in response to determining that the data package is not already encrypted.

16. The processing system of claim 11, wherein the operational instructions, when executed by the at least one processor, further cause the processing system to encode the data package to produce the set of slices in response to determining not to encrypt the data.

17. The processing system of claim 11, wherein the encryption approach includes utilizing an all or nothing transformation function, and wherein decrypting the secure package includes:
combining the secure package to produce encrypted data and a masked key;
performing an exclusive OR function on a hash of the encrypted data and the masked key to produce a key; and
decrypting the encrypted data utilizing the key to produce the data package.

18. The processing system of claim 11, wherein the validity indicator that indicates that the reproduced data is valid when the comparison indicates that a calculated difference between the received integrity value and the calculated integrity value compares favorably to a difference threshold.

19. The processing system of claim 11, wherein validity indicator that indicates that the reproduced data is valid when the comparison indicates that the received integrity value is equal to the calculated integrity value.

20. A computer readable storage medium comprises:
at least one memory section that stores operational instructions that, when executed by a processing system of a dispersed storage network (DSN) that includes a processor and a memory, causes the processing system to:
perform a deterministic function on data for storage to produce an integrity value;
combine the data and the integrity value in accordance with a combining function to produce a data package;
determine whether to encrypt the data package;
determine an encryption approach in response to determining to encrypt the data package;
encrypt the data package in accordance with the encryption approach to produce a secure package;
encode the secure package to produce a set of slices;
decode the set of slices to reproduce the secure package;
identify the encryption approach associated with the secure package;
decrypt the secure package in accordance with the encryption approach to reproduce the data package;
de-combine the data package in accordance with the combining function to generate reproduced data and a received integrity value;
perform the deterministic function on the data to produce a calculated integrity value; and
generate a validity indicator of the reproduced data based on a comparison of the received integrity value and the calculated integrity value.

\* \* \* \* \*